(12) United States Patent
Bosworth et al.

(10) Patent No.: US 8,984,079 B2
(45) Date of Patent: *Mar. 17, 2015

(54) PROVIDING A NEWSFEED BASED ON USER AFFINITY IN A SOCIAL NETWORK ENVIRONMENT

(71) Applicants: Andrew G. Bosworth, Palo Alto, CA (US); Chris Cox, Palo Alto, CA (US)

(72) Inventors: Andrew G. Bosworth, Palo Alto, CA (US); Chris Cox, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/846,890

(22) Filed: Mar. 18, 2013

(65) Prior Publication Data

US 2013/0218976 A1    Aug. 22, 2013

Related U.S. Application Data

(63) Continuation of application No. 11/503,093, filed on Aug. 11, 2006, now Pat. No. 8,402,094.

(51) Int. Cl.
*G06F 15/16* (2006.01)
*H04L 29/08* (2006.01)
*G06Q 30/08* (2012.01)

(52) U.S. Cl.
CPC ............... *H04L 67/22* (2013.01); *G06Q 30/08* (2013.01); *H04L 67/306* (2013.01)

USPC ................. 709/206; 709/217; 705/319

(58) Field of Classification Search
USPC .................. 709/206, 217; 705/319
See application file for complete search history.

(56) References Cited

U.S. PATENT DOCUMENTS

| | | | |
|---|---|---|---|
| 2005/0198305 A1* | 9/2005 | Pezaris et al. | 709/227 |
| 2006/0048059 A1 | 3/2006 | Etkin | |
| 2006/0143067 A1 | 6/2006 | Calabria | |
| 2007/0124493 A1* | 5/2007 | Fogg | 709/231 |

OTHER PUBLICATIONS

Japanese Patent Office, Notice of Grounds for Rejection, Japanese Patent Application No. P2009-523826, Feb. 5, 2013, five pages.
Takai, K., et al., "ACS: A Social Networking System for Various Human Relations," *IPSJ Symposium Series*, 2006, pp. 577-580, with English abstract.
Tsuruoka, N., "Web 2.0 Practice Technique, Google!/Yahoo!/REST," May 25, 2006, pp. 84-90, vol. 32, Firdt Edition, WEB+DB Press, Japan.

* cited by examiner

*Primary Examiner* — Thomas Dailey
(74) *Attorney, Agent, or Firm* — Fenwick & West LLP

(57) ABSTRACT

A system and method for measuring user affinity in a social network environment is provided. One or more activities performed by a user associated with a social network environment are monitored. A relationship associated with the one or more activities is identified. An affinity for one or more objects associated with the social network environment is then determined based on the one or more activities and the relationship.

20 Claims, 5 Drawing Sheets

PROVIDING A NEWSFEED BASED ON USER AFFINITY IN A SOCIAL NETWORK ENVIRONMENT

CROSS REFERENCE TO RELATED APPLICATIONS

This application is a continuation of U.S. application Ser. No. 11/503,093, filed Aug. 11, 2006, now U.S. Pat. No. 8,402,094, which is incorporated by reference in its entirety.

BACKGROUND

The present invention relates generally to social networking, and more particularly to systems and methods for measuring user affinity in a social network environment.

Conventionally, a user of a social networking website connects with other users by providing information about the user to the social network website for access by other users. For example, a user may post contact information, background information, current job position, hobbies, and so forth. Other users may review this information by browsing through profiles or entering keyword(s) into an internal search engine that searches the social networking site for profiles containing the keyword(s).

Recently, social networking websites have developed systems for better connecting users to the content most relevant to each particular user. For example, users may be grouped together in one or more groupings based on any common factor listed in their profile, such as geographical location, employer, job type, music preferences, and so forth. Parties within and outside of the social networking website utilize these groupings to target information that would be of interest to that particular community. For example, a social networking site may display banner ads advertising a concert too all users who list the performing band on their profile. As social networking has grown more popular, however, users and the information they provide on their profiles has greatly increased. Consequently, users are often inundated with information that is not necessarily the most relevant to a particular user.

SUMMARY

The present invention provides a system and method for measuring user affinity in a social network environment. One or more activities performed by a user associated with a social network environment are monitored. A relationship associated with the one or more activities is identified. An affinity for one or more objects associated with the social network environment is then determined based on the one or more activities and the relationship.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A system and method for measuring user affinity in a social network environment is provided. The user affinity may be measured by utilizing relationships the user has with other users. The user affinity may also be measured by monitoring the user's interaction with content, such as stories, headlines, or other user's profiles, and/or the user's interaction with other users, directly, such as emails to other users. The user affinity may be utilized to generate media for the user about other users, such as stories about other users with which the user has a relationship.

Figure 1:
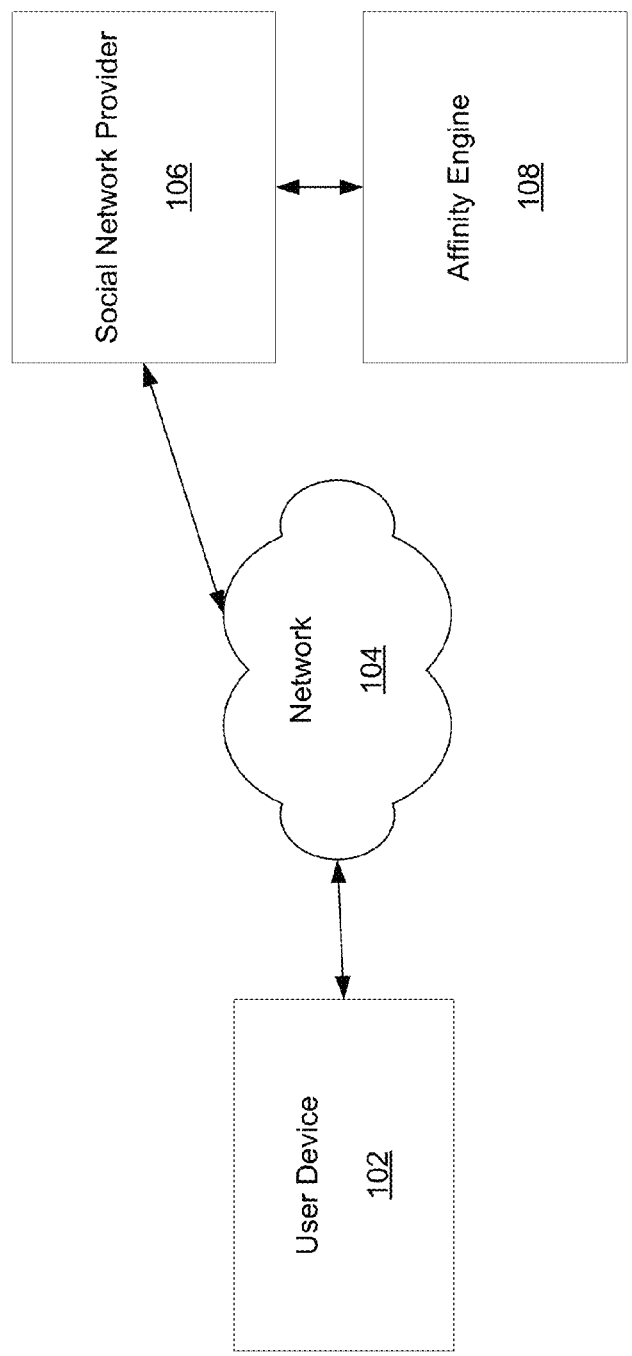
FIG. 1 illustrates a schematic diagram of an exemplary environment for measuring user affinity in a social network environment.

FIG. 1 illustrates a schematic diagram of an exemplary environment for measuring user affinity in a social network environment. One or more users, such as a user at a user device 102, are coupled to a social network provider 106 via a network 104.

The social network provider 106 may comprise any user or entity that provides social networking services, communication services, dating services, and so forth. For example, the social network provider 106 may host a website that allows two or more users, such as the user at the user device 102, to communicate with one another via the website. In one instance, a first user associated with the user device 102 may communicate with one or more second users associated with one or more second user devices via a social networking website associated with the social network provider 106. The social networking website offers the user an opportunity to connect or reconnect with the one or more second users who attended, for example, the same university as the user.

An affinity engine 108 is coupled to the social network provider 106. The affinity engine 108 utilizes data, such as data about one or more users, to measure the users' affinity for one or more items of media or any other content. According to some embodiments, the user device 102 may be directly coupled to the affinity engine 108. According to other embodiments, the affinity engine 108 comprises a module associated with the social network provider 106.

Figure 2:
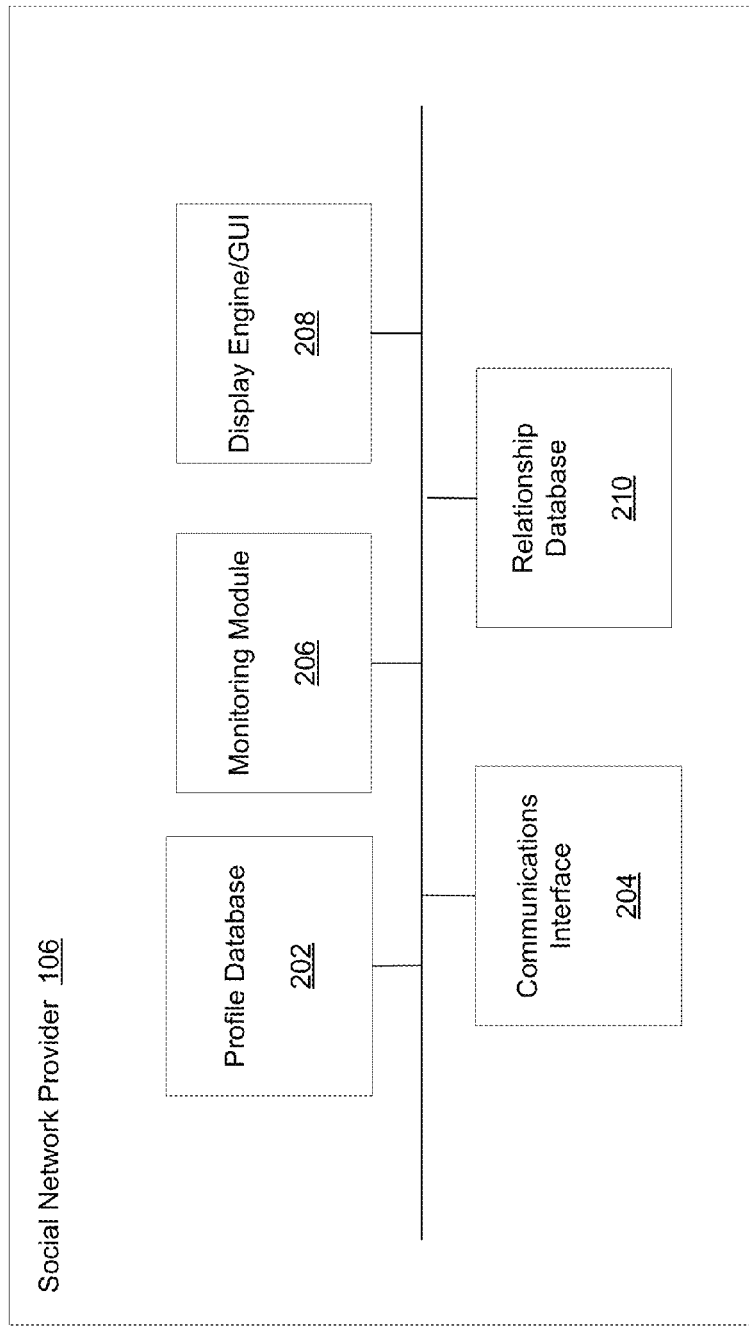
FIG. 2 illustrates a schematic diagram of an exemplary social network provider.

Referring now to FIG. 2, a schematic diagram of an exemplary social network provider, such as the social network provider 106 discussed in FIG. 1, is shown. A profile database 202 is provided for storing data associated with each of the users, such as the user associated with the user device 102. When a user subscribes to services provided by the social network provider 106, a user profile may be generated for the user. For example, the user may select privacy settings, provide contact information, or group other users according to one or more categories. When the user adds additional information to the user profile, such as adding additional contacts, the user profile in the profile database 202 may be updated with the information added. The user profile may be stored, modified, added, and so forth to any storage medium.

According to some embodiments, the user profile is created outside of the social network environment and provided to or accessed by the social network provider 106. Alternatively, the profile database 202 may be located remotely and accessed by the social network provider 106.

The social network provider 106 includes a communications interface 204 for communicating with the users, such as via the user device 102 described herein, over the network 104. The user device 102 communicates various types of information, such as privacy settings selections, groupings of other users, and so forth, to the social network provider 106 via the communications interface 204. Any type of communications interface 204 is within the scope of various embodiments.

A monitoring module 206 tracks one or more user activities on the social networking website. For example, the monitoring module 206 can track user interaction with one or more items of media, such as news stories, other users' profiles, email to other users, chat rooms provided via the social network provider 106, and so forth. Any type of user activity can be tracked or monitored via the monitoring module 206. The information, people, groups, stories, and so forth, with which the user interacts, may be represented by one or more objects, according to exemplary embodiments.

A relationship the user has with one or more other users may be defined according to the user's profile and/or according to other users with which the monitoring module 206 detects user interaction. For example, a particular user may define a relationship with his wife or a friend in the particular user's profile. However, a relationship may also be defined by the social network provider 106 when the particular user interacts with one or more other users that share a common interest in a musical band, for instance. Further, a strength of the relationship defined in the particular user's profile, such as wife or friend, may be updated or adjusted according to how often the particular user interacts with the wife or the friend, for example.

A display engine/GUI 208 may also be provided by the social network provider 106. The display engine/GUI 208 displays the one or more items of media, profile information, and so forth to the users. The users can interact with the social network provider 106 via the display engine/GUI 208. For example, the users can select privacy settings, access their own user profile, access other users' information available via the social network provider, and so forth via the display engine/GUI 208.

A relationship database 210 is provided for storing relationship data about each user. The user can specify relationships with one or more other users via the user profile, or by any other means. The user can assign categories, groups, networks, and so forth to the one or more other users with which the user has a relationship. The relationship, for example, may specify that a user is a family member, schoolmate, ex-girlfriend, and so forth. Any type of relationship may be specified.

According to some embodiments, the social network provider 106 may determine a relationship for the user. For example, if the user establishes communications with another user interested in Woody Allen movies, the social network provider 106 may assign the relationship of fellow Woody Allen movie fan. The social network provider 106 may inquire whether or not the user wants to add the other user as a fellow Woody Allen fan, in one instance. Alternatively, the social network provider 106 may utilize a common interest in Woody Allen movies as a variable to measure user affinity, without inquiring whether the user wants to add the other user to the user's profile, according to some embodiments.

A relationship may be assigned based on the user's interaction with other users or with any type of content. The user may have more than one relationship with other users or with content, according to exemplary embodiments. For example, the user's brother qualifies as one type of relationship, while the fact that the user's brother attended the same university as the user may qualify as another relationship. Any number of relationships may be established for each user and/or for each activity performed by the user in the social network environment.

According to exemplary embodiments, one or more networks may be provided for each user. For example, the user may have a network comprised of people grouped according to a university attended, a network comprised of people grouped according to the user's geographical location of residence, a network comprised of people grouped according to a common field of work, a network comprised of people grouped according to a particular business, and so forth. As discussed herein, a common network may establish a relationship between the user and other users in the common network, for example.

Any type of network may be provided by the social network provider 106. In other words, a network may comprise people grouped according to any type of category, such as various social networks described herein, like "friends", "geographical location", and so forth. The user may specify the networks, the categories, subcategories, and so forth and/or the networks, the categories, the subcategories, and so on may be predetermined by the social network provider 106. The networks, the categories, the subcategories, and so forth may comprise a relationship with the user, as discussed herein, but do not necessarily comprise the only relationship the user has with the other users.

Although the social network provider 106 is described as being comprised of various components (the profile database 202, the communications interface 204, the monitoring module 206, the display engine/GUI 208, and the relationship database 210), fewer or more components may comprise the social network provider 106 and still fall within the scope of various embodiments.

Figure 3:
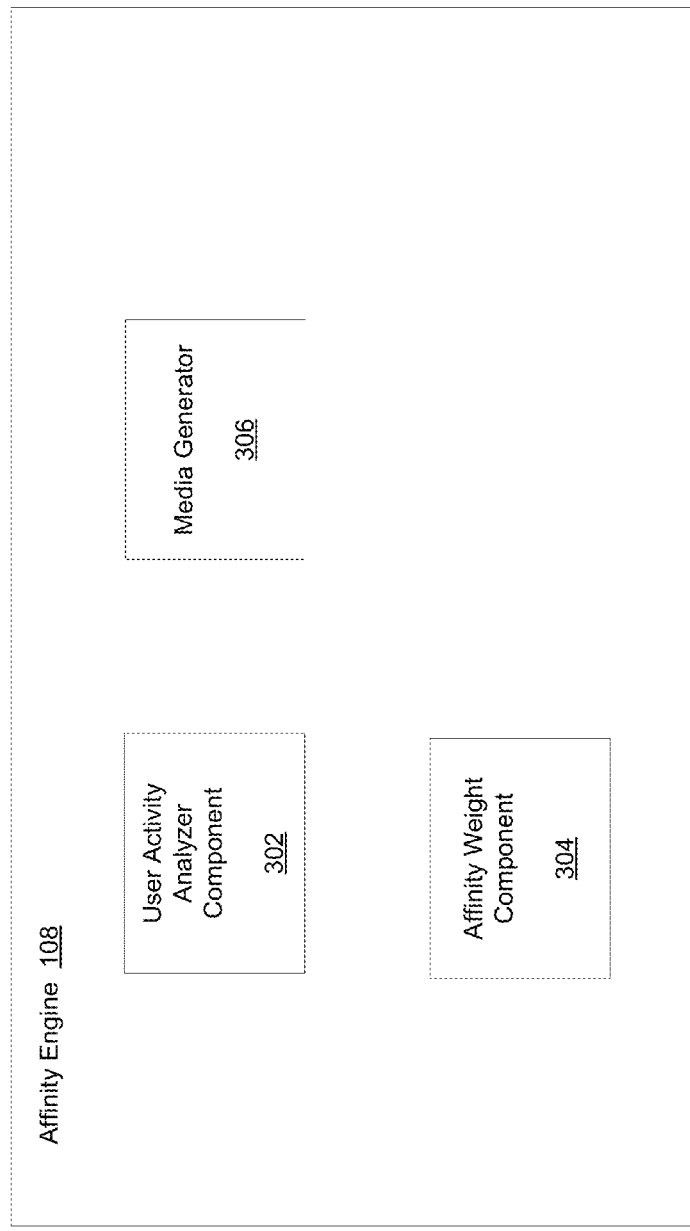
FIG. 3 illustrates a schematic diagram of an exemplary affinity engine.

FIG. 3 illustrates a schematic diagram of an exemplary affinity engine. A user activity analyzer component 302 accesses the one or more user activities detected by the monitoring module 206. The user activity analyzer component 302 analyzes the user activities to determine whether one or more of the activities indicate an affinity for subject matter, content, other users, and so forth. Optionally, the user activities may be stored in a user activity storage medium (not shown) associated with the affinity engine 108 and/or the social network provider 106.

An affinity assignment component 304 can access data from the relationship database 210 and from the user activity analyzer component 302 to assign an affinity rating and/or weight to subject matter, other users, and so forth, for each user. For example, a particular user's wife is assigned a rating based on a spousal relationship with the particular user, while the particular user's brother receives a different rating based on a sibling relationship. The user activity may be weighted differently from the user relationship. For example, the rating assigned to a user activity may comprise sixty percent (60%) of the overall affinity, while the relationship associated with the user activity comprises the other forty percent (40%) of the overall affinity determined for the user. The weights may be static or the weights may change according to a type of relationship, a type of user activity, and so forth.

Based on the one or more user activities and the relationships, an overall affinity for past, present, or future content can be determined by the affinity assignment component 304. According to exemplary embodiments, a particular user activity is assigned both a rating and a weight while a relationship associated with the particular user activity is assigned a rating and a correlating weight (e.g., so the weights total 100%). The ratings may be combined according to their weights to determine an overall affinity for the user. For example, a particular user may receive content associated with the particular user's wife as a lower priority than content associated with the particular user's brother because although the particular user's wife has a higher rated relationship, the particular user accesses content about his brother more often. Depending upon the weights assigned to the activities and relationships for the particular user, the overall affinity may be determined to be higher for content about the user's brother than for content about the user's wife, in one instance. Any type of variables, such as time since information was accessed, frequency of access, relationship to person about which information was accessed, relationship to person sharing common interests in information accessed, relationship with the actual information accessed, and so forth, may be considered when assigning ratings and weights to the activities performed by the user and the relationships associated with the activities.

According to exemplary embodiments, an overall affinity for the user for each user, subject matter, type of content, and so forth may be established. The overall affinity may change based on continued monitoring of the user's activities or the overall affinity may be utilized to establish ratings for activities and/or relationships.

The weights and/or the ratings may vary for the one or more user activities and for the relationships associated with the one or more user activities, as discussed herein. According to exemplary embodiments, a user activity is assigned an initial rating that is adjusted according to the rating and the affinity weight assigned to the relationship data associated with the user activity. Any type of process may be employed for assigning, combining, averaging, and so forth the ratings and the weights assigned to the one or more user activities and the relationships associated with the one or more user activities. As discussed herein, user activities may be utilized as feedback for adjusting ratings and weights assigned to the user activities and/or the relationships associated with the user activities. For example, the user's relationship with an existing girlfriend may rate higher than a relationship rating with the user's ex-girlfriend, but the affinity weight for the ex-girlfriend may be higher based on the number of times the user has accessed one or more items of media or other content about the ex-girlfriend in the past month.

Any type of overall affinity may be determined utilizing any number of variables representative of activities and relationships, such as statistical metrics, long term averages of user interactions, short term averages of user interactions, decay factors (e.g., the rate at which values associated with user interactions erodes through time), time, feedback, and so forth. The ratings and weights may be continuously updated based on continued tracking of the one or more user activities by the monitoring module 206. Any rating, weight, and so forth may be assigned to each variable that is considered in determining an overall affinity. As discussed herein, the overall affinity may be established for various types of content, other users, categories of content, such as parties, and so forth.

The overall affinity determined by the affinity assignment component 304 may be utilized for providing various types of information, such as media, to the users. For example, the user may be presented with updated photos from a photo album from another user for which the user has a high overall affinity, stories about another user for which the user has a high overall affinity, or details about a party hosted by another user for which the user has a high overall affinity. The overall affinity may be utilized to generate and/or present any type of data to a particular user.

A media generator component 306 may, optionally, be provided as part of the affinity engine 108. The media generator component 306 utilizes the affinity determined by the affinity assignment component 304 to select and/or generate one or more items of media, such as stories. For example, the media generator component 306 can generate a story for a "User A" about a "User B" breaking up with a "User C" based on a high affinity that "User A" has for "User B" and/or "User C." The story in this instance is unique to "User A" since the relationship that "User A" has with "User B" and/or "User C" may be different than the relationship a "User D" may have with "User B" and/or "User C", for example. Any type of media, stories, content, and so forth may be generated and/or provided to the user based on the affinity.

The affinity assignment component 304 may also be utilized to assign an order to the media, the stories, the content, and so forth. For example, the story about "User B" breaking up with "User C" may be rated lower than a story about "User A's" brother having a baby, and accordingly, the story about "User B" breaking up with "User C" may appear below the story about "User A's" brother having a baby on a display page associated with "User A." Any type data may be assigned an order according to the affinity determined for the user based on the user's past or present activities and the relationships associated with the past or the present activities. According to some embodiments, the media may be generated and/or ordered according to a prediction of future user activities.

Furthermore, some user interactions may be assigned a higher weight and/or rating than other user interactions, which may affect the overall affinity. For example, if a user emails another user, the weight or the rating for the interaction may be higher than if the user simply looks at the profile page for the other user. Any type of weights or ratings may be assigned to user interactions, relationships, and so forth. Further, any type of formula or process for determining the affinity may be employed by the affinity assignment component 304.

According to exemplary embodiments, a user can utilize privacy setting selections to ensure that media regarding particular users is not included on the display page associated with the user. Alternatively, the user can request from the social network provider 106 that the user not receive data about particular users. Any type of privacy settings or requests may be provided by the user for blocking news, content, and so forth about particular users.

Figure 4:
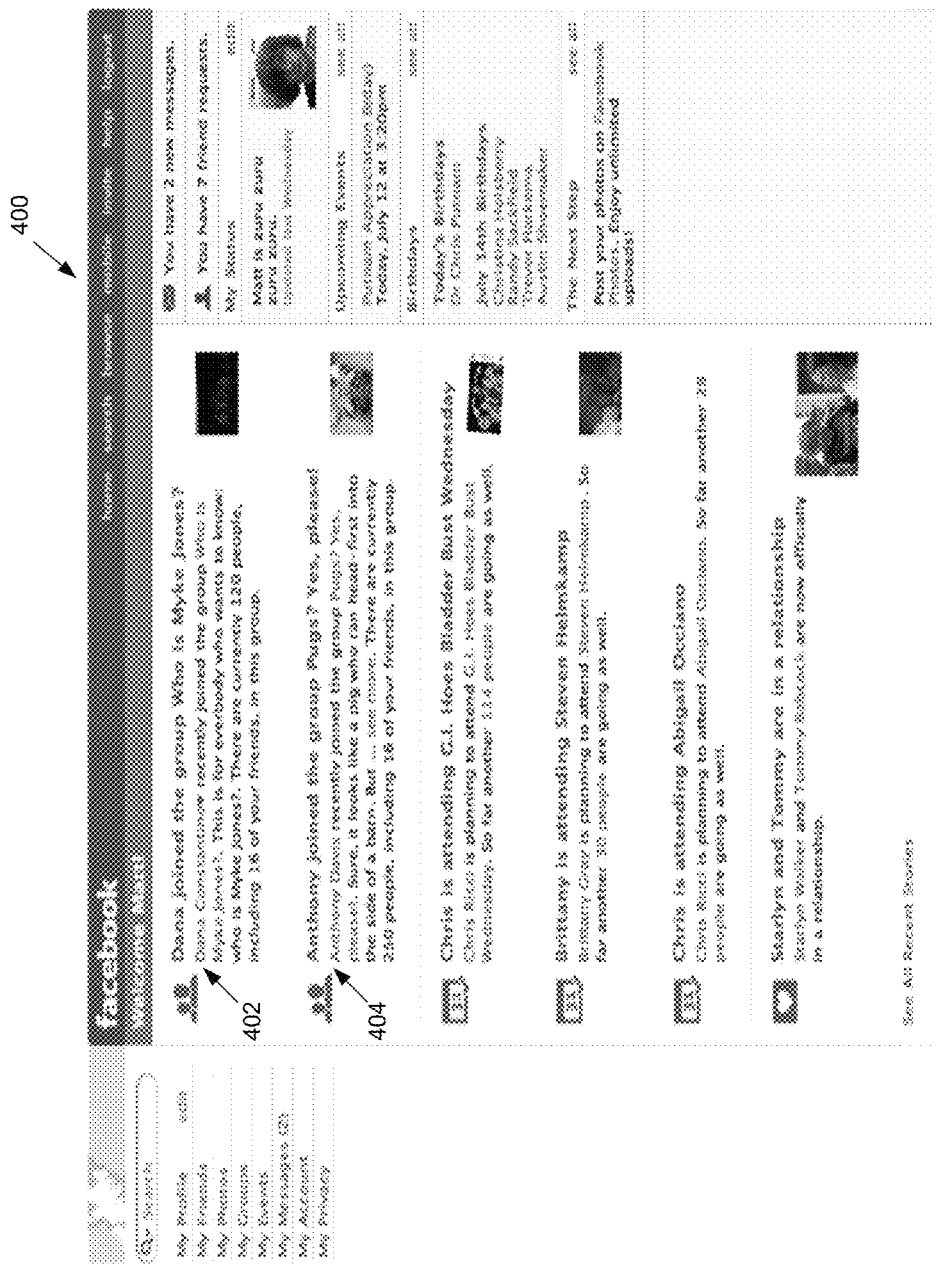
FIG. 4 illustrates an exemplary screen shot of one or more items of media displayed to a user based on user affinity.

FIG. 4 shows an exemplary screen shot 400 of one or more items of media displayed to a user based on user affinity. The exemplary screen shot 400 represents the display page associated with a particular user, such as the user at user device 102. Various stories, content, media, and so forth may be displayed via the display page. In the exemplary screen shot shown in FIG. 4, several stories and/or story headlines are displayed.

A first story 402, entitled "Dana joined the group Who is Myke Jones?" was rated highest according to affinity. As discussed herein, an overall affinity may have been assigned to each story appearing on the display page, based on the user's interaction with other content and the user's relationships associated with the user's interaction with the other content. The stories are then displayed in an order according to the affinity. For example, the first story 402 is assigned the highest order based on the affinity determined for the user for content and/or other users included in the first story 402, while a second story 404, entitled "Anthony joined the group Pugs? Yes, please!", is assigned the second highest order based on the affinity determined for the user with respect to the content and/or the other users included in the second story 404, and so forth.

Although the affinity is determined based on the one or more user activities within the social network environment, according to some embodiments, user activity outside of the social network environment may also be considered in determining overall user affinity for content and/or other users. The relationships the user has with other users affects the weights and/or the ratings of the one or more user activities, since the one or more user activities have varying significance for each user according to the one or more relationships associated with each activity the user performs, as discussed herein. For example, if a "User A" posts comments to a display page associated with "User B", who is a friend of "User A", the activity may be assigned a higher rating or weight than if "User A" posts comments to a display page associated with "User C", who is a co-worker of "User A." As discussed herein, the relationships may be obtained from categories, groups, and so forth that the user assigns to other users or from any other information the social network provider 106 obtains about the user.

Figure 5:
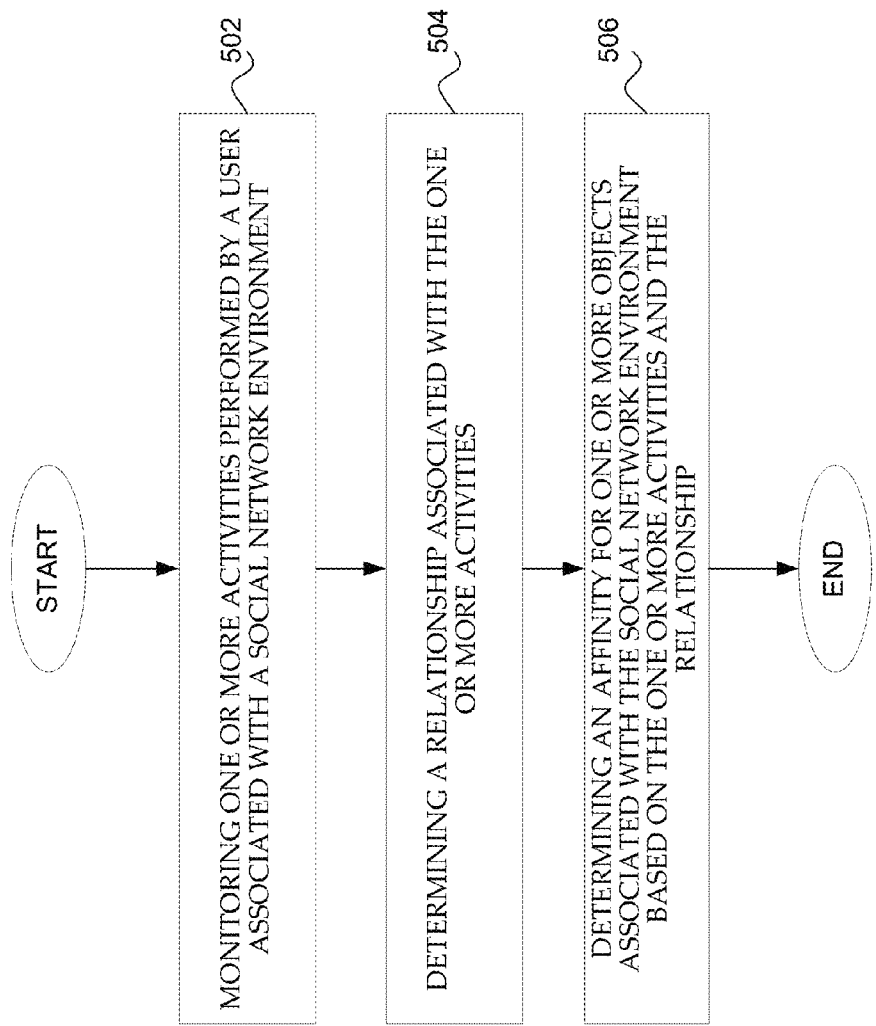
FIG. 5 illustrates a flow diagram of an exemplary process for measuring user affinity in a social network environment.

Referring now to FIG. 5, a flow diagram of an exemplary process for measuring user affinity in a social network environment is illustrated. At step 502, one or more activities performed by a user associated with a social network environment are monitored. For example, the monitoring module 206 associated with the social network provider 106 can monitor the one or more activities performed by the user. The one or more activities may include emails, viewing of user profiles, viewing of users' photos, sending messages to other user, and so forth, as discussed herein.

At step 504, a relationship associated with the one or more activities is determined. As discussed herein, the relationship database 210 can provide one or more relationships the user has with other users or content with which the user is interacting. For example, if the user accesses a profile for a "User A", the relationship database 210 can provide the data that the relationship the user has with "User A" is that "User A" is the user's girlfriend. Accordingly, the relationship associated with the user accessing the profile for "User A" is that the user is accessing the user's girlfriend's profile. More than one relationship may be associated with the one or more user activities. For example, the user's girlfriend may also cohabitate with the user and thus, the relationship database 210 may indicate a cohabitation relationship exists as well.

As discussed herein, relationships may each be assigned different weights and ratings. Similarly, the one or more user activities, such as user interactions with other users or content, may also be assigned varying weights and ratings.

At step 506, an affinity for one or more objects associated with the social network environment is determined based on the one or more activities and the relationship. The one or more objects may include other users, subject matter, categories, and so forth. The affinity may be based on an affinity weight and rating assigned to the one or more user activities and the relationship(s) associated with the one or more user activities. The one or more user activities may comprise emailing one or more other users, viewing profiles for one or more other users, viewing content posted by or for one or more other users, viewing content posted for the user, himself, and so forth. Any type of activities may be monitored and utilized to determine the affinity.

As discussed herein, one or more items of media, such as stories, photos, and so forth, may be generated, or optionally provided, based on the user affinity. According to exemplary embodiments, the affinity is updated according to the user interactions with content displayed to the user as a result of the affinity. For example, if the fifth story displayed to the user is a story about the user's best friend's ex-girlfriend and the user accesses the story first, the relationship between the user and the best friend and/or the best friend's ex-girlfriend may be assigned a higher rating. Accordingly, future stories about the user's best friend and/or the best friend's ex-girlfriend may be ranked higher than other stories.

While various embodiments have been described above, it should be understood that they have been presented by way of example only, and not limitation. For example, any of the elements associated with the affinity engine may employ any of the desired functionality set forth hereinabove. Thus, the breadth and scope of a preferred embodiment should not be limited by any of the above-described exemplary embodiments.

What is claimed is:

1. A computer-implemented method comprising:
receiving information about one or more actions, each action associated with one or more users who are connected to a viewing user in a social networking system;
generating one or more stories, wherein each of the one or more stories comprises a description of at least one action of the one or more actions and an identification of at least one of the one or more users associated with the action who are connected to the viewing user in the social networking system;
determining, by a process running on the social networking system, an affinity of the viewing user for each of a plurality of the generated stories, where the viewing user's affinity for a story is based at least in part on the viewing user's previous accesses of information about the action described in the story and the users identified in the story;
comparing the determined viewing user's affinities for the generated stories;
selecting one or more of the generated stories for the user based at least in part on the comparing;
generating a newsfeed comprising the selected stories; and
sending the newsfeed for display to the viewing user.

2. The method of claim 1, wherein the one or more actions comprise actions that were performed by at least one of the one or more users who are connected to the viewing user in the social networking system.

3. The method of claim 1, wherein the viewing user's affinity for each story is based on a plurality of the viewing user's historical interactions with one or more of the users identified in the story.

4. The method of claim 3, wherein an effect of the viewing user's historical interactions on the viewing user's affinity for each story is weighted based on a type of the historical interactions.

5. The method of claim 1, wherein the viewing user's affinity for each story is based on a frequency of the viewing user's historical interactions with one or more of the users identified in the story.

6. The method of claim 5, wherein the viewing user's affinity for each story is further based on a decay factor, wherein the decay factor is a rate at which an effect of the historical interactions on the viewing user's affinity erodes over time.

7. The method of claim 1, wherein the viewing user's affinity for each story is based on a type of relationship between the viewing user and one or more of the users identified in the story.

8. The method of claim 1, wherein the viewing user's affinity for each story is based on a plurality of the viewing user's historical interactions with content associated with one or more of the users identified in the story.

9. The method of claim 1, wherein the viewing user's affinity for each story is based on one or more common interests between the viewing user and one or more of the users identified in the story.

10. The method of claim 1, wherein the viewing user's affinity for each story is based on feedback received from the viewing user about one or more of the users identified in the story.

11. A computer program product embodied on a non-transitory computer readable storage medium including instructions for:
receiving information about one or more actions, each action associated with one or more users who are connected to a viewing user in a social networking system;
generating one or more stories, wherein each of the one or more stories comprises a description of at least one action of the one or more actions and an identification of at least one of the one or more users associated with the action who are connected to the viewing user in the social networking system;
determining, by a process running on the social networking system, an affinity of the viewing user for each of a plurality of the generated stories, where the viewing user's affinity for a story is based at least in part on the viewing user's previous accesses of information about the action described in the story and the users identified in the story;
comparing the determined viewing user's affinities for the generated stories;
selecting one or more of the generated stories for the user based at least in part on the comparing;
generating a newsfeed comprising the selected stories; and
sending the newsfeed for display to the viewing user.

12. The computer program product of claim 11, wherein the one or more actions comprise actions that were performed by at least one of the one or more users who are connected to the viewing user in the social networking system.

13. The computer program product of claim 11, wherein the viewing user's affinity for each story is based on a plurality of the viewing user's historical interactions with one or more of the users identified in the story.

14. The computer program product of claim 13, wherein an effect of the viewing user's historical interactions on the viewing user's affinity for each story is weighted based on a type of the historical interactions.

15. The computer program product of claim 11, wherein the viewing user's affinity for each story is based on a frequency of the viewing user's historical interactions with one or more of the users identified in the story.

16. The computer program product of claim 15, wherein the viewing user's affinity for each story is further based on a decay factor, wherein the decay factor is a rate at which an effect of the historical interactions on the viewing user's affinity erodes over time.

17. The computer program product of claim 11, wherein the viewing user's affinity for each story is based on a type of relationship between the viewing user and one or more of the users identified in the story.

18. The computer program product of claim 11, wherein the viewing user's affinity for each story is based on a plurality of the viewing user's historical interactions with content associated with one or more of the users identified in the story.

19. The computer program product of claim 11, wherein the viewing user's affinity for each story is based on one or more common interests between the viewing user and one or more of the users identified in the story.

20. The computer program product of claim 11, wherein the viewing user's affinity for each story is based on feedback received from the viewing user about one or more of the users identified in the story.

* * * * *